United States Patent
Zagotta et al.

[15] 3,680,737
[45] Aug. 1, 1972

[54] FLUIDIC GRAIN PLANTING CONTROL

[72] Inventors: Joseph L. Zagotta, Chicago; R. Eugene Wallace, Elmhurst, both of Ill.; Donald A. McCallum, Burlington, Ontario, Canada

[73] Assignee: International Harvester Company, Chicago, Ill.

[22] Filed: June 3, 1971

[21] Appl. No.: 149,490

[52] U.S. Cl. ................................................221/211
[51] Int. Cl. ..............................................B65g 59/04
[58] Field of Search .....................221/211; 137/81.5

[56] References Cited

UNITED STATES PATENTS 1,637,834  8/1927  Oliver.............................221/211
3,240,175  3/1966  Clow..........................221/211 X
3,380,626  4/1968  Giannini....................221/211 X Primary Examiner—M. Henson Wood, Jr.
Assistant Examiner—John J. Love
Attorney—Floyd B. Harman

[57] ABSTRACT

A pneumatic planter type having a seed supply, wherein air under pressure is supplied to a rotary feed wheel having radial pickup fingers, an air control device is provided for each of the fingers having means for utilizing the air pressure to generate a vacuum to attract seed to the finger as it passes through the seed supply and alternately converting the air stream to positive pressure after a predetermined rotation of the feed wheel to successively discharge the seed from the fingers.

10 Claims, 5 Drawing Figures

INVENTORS
JOSEPH L. ZAGOTTA
R. EUGENE WALLACE
DONALD A. McCALLUM

BY ATT'Y 3,680,737

FLUIDIC GRAIN PLANTING CONTROL

BACKGROUND OF THE INVENTION

1. Field of the Invention

This invention relates to planters and particularly to seed metering mechanism for high speed precision planters. More specifically, the invention concerns a planter of the pneumatic type.

Modern high speed planting practices have necessitated the development of precision planters capable of accurately selecting seed from a supply and depositing it in a furrow at regular intervals. Planting equipment in common use for seed such as corn has been of the celled seed plate type requiring the seed to be graded to uniform size, and it has been necessary to select from a multiplicity of plates one having cells to fit the size of seed to be planted. When operated at relatively high speeds some of the seed cells of such planters remain unfilled, resulting in irregular deposition of seed in the furrow.

2. Description of the Prior Art

In an effort to meet the demand for high speed and uniform seed planting as well as to eliminate the need for graded seed, planters utilizing pneumatic principles have been proposed with a view to selecting a seed by vacuum from an ungraded supply without damaging the seed, and discharging it by releasing the vacuum.

Pneumatic planters generally consist of a rotatable drum or wheel having projecting fingers provided with a pickup opening or port communicating with a source of vacuum, and such planters as have been proposed have been complicated and expensive, requiring powerful pumps to maintain the required vacuum and in many cases requiring a separate source of air pressure to discharge the seed from the pickup finger. A planter of this general type is disclosed in the U.S. patent to Clow U.S. Pat. No. 3,240,175 of Mar. 15, 1966. Furthermore, at the speed with which the fingers pass through the seed supply, seed frequently packs and fails to adhere to the vacuum ported fingers, resulting in ununiform discharge of seed to the furrow.

Another type of prior art pneumatic planter utilizes a perforated rotating drum. Seed is supplied internally of the drum, and individual seeds are held in the perforations by the air pressure differential. At a discharge location, the perforation in the drum is closed, the seed is released and falls into a discharge tube when it is carried in a stream of air to the furrow. A planter of this type is disclosed in the U.S. patent application to Loesch et al., Ser. No. 836,480, filed June 25, 1969.

SUMMARY OF THE INVENTION

The general purpose of this invention is to provide a seed selector that utilizes a fluidic device for switching from a vacuum to a positive air pressure at the ends of the pickup fingers.

An object of the invention is the provision, in a planter of the pneumatic type wherein seed is selected from a supply by vacuum, of means for utilizing a stream of pressurized air to apply a vacuum to the seed selecting port to attract and hold the seed, and for alternately directing the same stream of air under pressure to the seed selector to forcibly discharge the seed to the furrow.

BRIEF DESCRIPTION OF THE DRAWINGS

FIG. 3 is an enlarged sectional view of the seed metering and dispensing structure approximately on line 3—3 of FIG. 2;

FIG. 5 is an enlarged perspective view of one of the air control devices effecting the alternate application of vacuum and air pressure to a seed pickup finger.

DESCRIPTION OF THE PREFERRED EMBODIMENT

Figure 1:
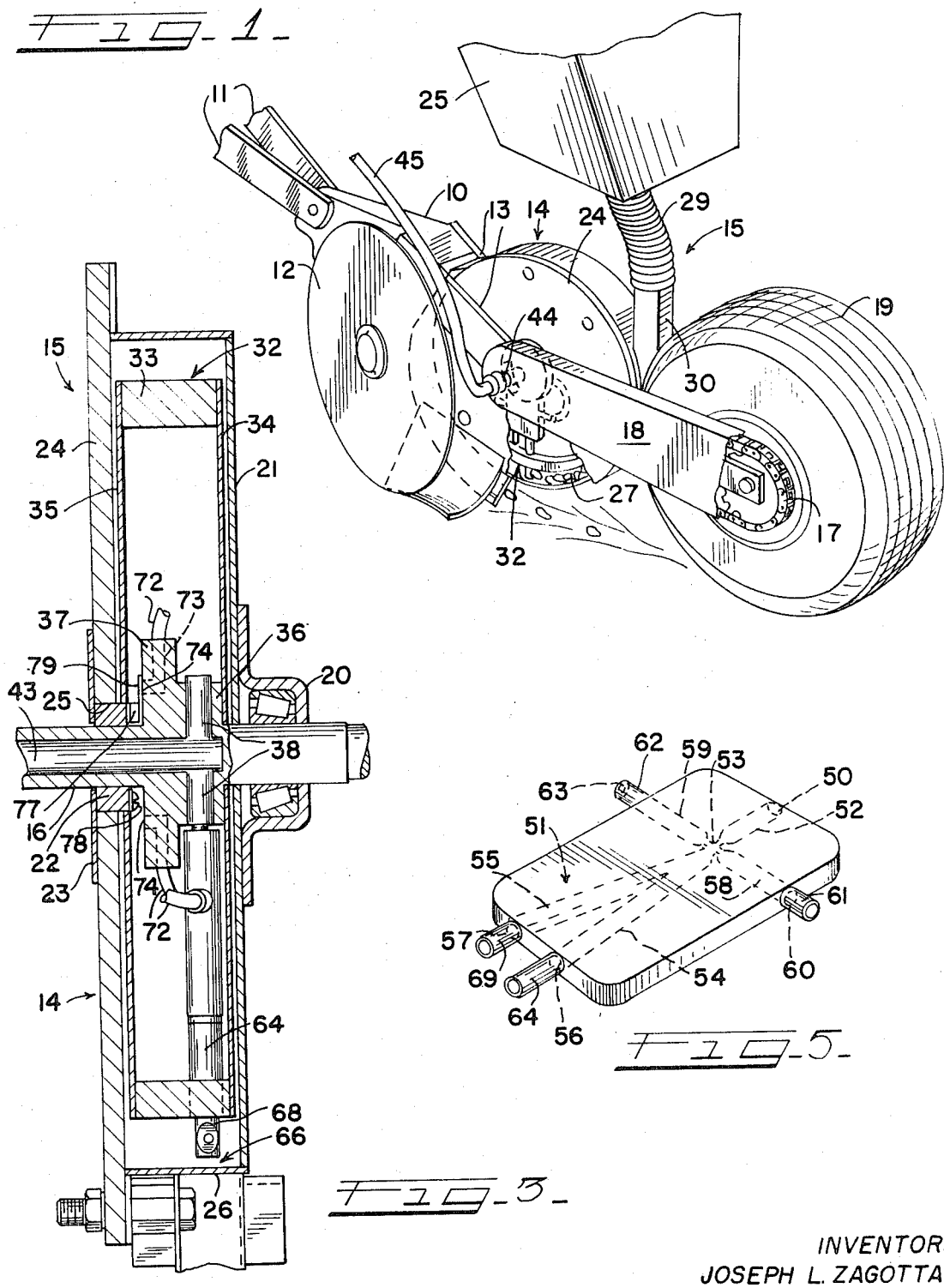
FIG. 1 is a perspective view, with parts removed, of a planter unit having seed metering mechanism incorporating the features of this invention.

The planter unit shown in FIG. 1 comprises a frame structure 10 attached by links 11 to a conventional planter tool bar, not shown, adapted for connection to a tractor, and it may be understood that several of such units may be mounted on the tool bar to form a multi-row planter. Also mounted on the planter frame is a disk furrow opener unit 12, and between a pair of arms 13, forming part of the frame 10 and rearwardly of disk unit 12, is secured a generally cylindrical housing 14 forming part of a seed metering assembly indicated generally at 15.

A shaft structure 16 rotatably carried by the ends of arms 13 extends axially through housing 14 and is connected in a manner well known in the art by a drive chain 17, partly enclosed in a cover plate 18 mounted on shaft structure 16, to a press wheel 19.

One end of shaft 16 is rotatable in a bearing 20 secured to one side 21 of the housing 14 and the other end is rotatable in a plate or bearing block 22 secured by a plate 23 to the other side 24 of the housing and seated in an opening 25 therein. The sides 21 and 24 of the housing are joined by a cylindrical peripheral closure 26.

Figure 2:
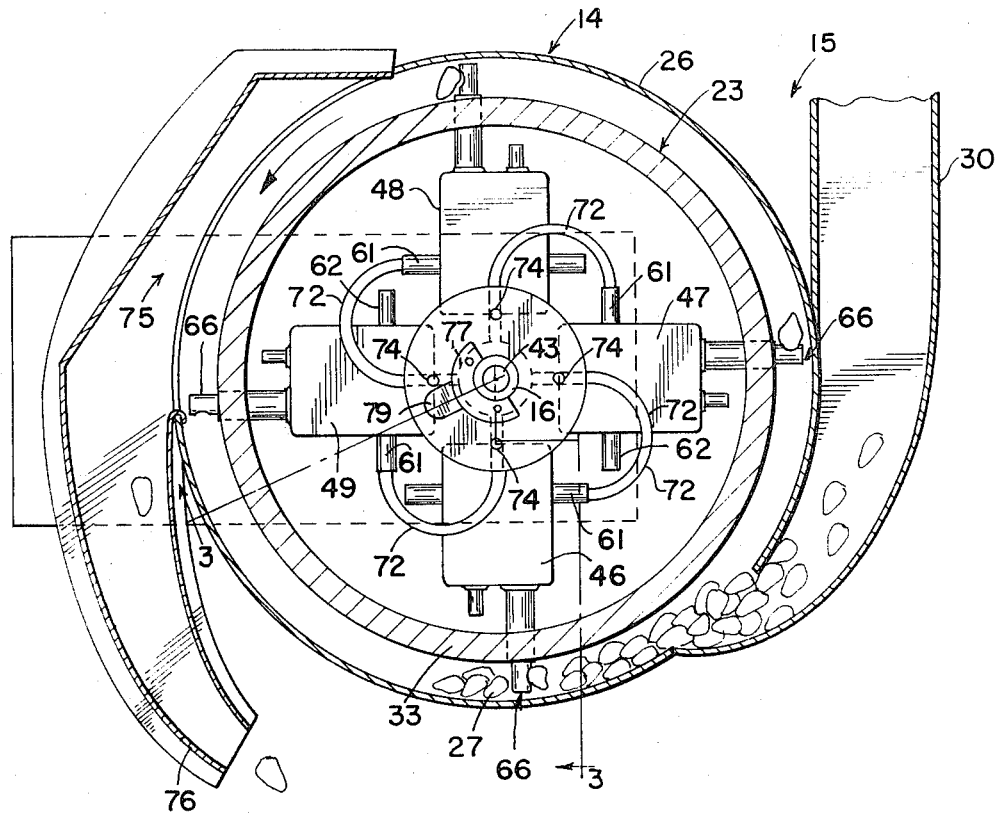
FIG. 2 is a side elevation, partly in section, and with parts removed, showing the seed metering mechanism of this invention.

As indicated in FIGS. 1 and 2, the lower part of the housing 14 forms a receptacle for a seed supply 27 fed thereto from a conventional hopper 28 through a flexible guide tube 29 connected at its lower end to a relatively rigid tube section 30 affixed tangentially to closure 26 and having its curved lower end connected to an opening 31 in the closure to discharge seed into the housing.

A rotatable feed wheel 32 in the housing 14 comprises a rim 33 and side plates 34 and 35. Side 34 having secured thereto a hub member 36 forming part of the shaft structure 16 and having an enlarged portion 37 spaced inwardly from side plate 35. A plurality of cavities 38 radiate from the center of hub member 36, as seen in FIG. 3, and communicate with the hollow interior 43 of shaft 16, the latter being connected by a coupling 44, shown in FIG. 1, to a hose 45 leading to a suitable source of constant air pressure preferably provided by the tractor by which the implement is propelled.

Air under constant pressure in the hollow interior 43 enters cavities 38 and is directed in continuous streams to air flow control and distributing devices 46, 47, 48, and 49, affixed to the sides of hub member 36. It should be noted that while four such devices are illustrated, any number could be used. Each of the control devices 46, 47, 48, and 49, as shown in FIG. 5, is a flattened rectangular block, preferably of plastic material or the like, coplanar with the feed wheel. Each device has an air supply port 50 at one end, connected by a tube to the associated cavity 38 in hub member 36. The air passages within each device includes a Y-shaped main channel designated by the numeral 51 comprised of a neck portion 52 connected through a restriction 53 with a pair of diverging branches 54 and 55. Diverging branches 54 and 55 terminate, respectively, in ports 56 and 57 at the end of the control device opposite supply port 50. The air passages within each device also include a control channel 58 and an oppositely disposed bias channel 59, which communicate at their inner ends with restriction 53. The outer end of control channel 58 terminates in a control port 60 and a fitting 61 and is vented to atmospheric pressure throughout a portion of each revolution of the feed wheel in a manner that will become clear hereinafter. Bias channel 59 terminates in a substantially closed fitting 62, provided, however, with a minute bias orifice 63 performing a function which will also hereinafter become clear.

Figure 4:
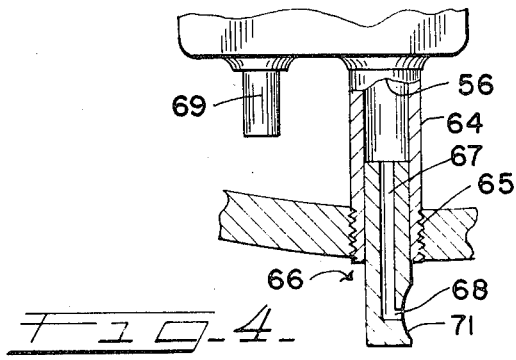
FIG. 4 is an enlarged sectional detail of a portion of the structure of FIG. 2 showing one of the seed pickup fingers.

As indicated in FIG. 4, each port 56 at the radially outer end of each of the control devices 46, 47, 48 and 49 has connected thereto a fitting 64 which is threaded for reception in a threaded opening 65 in rim 33, and in its outer end is seated a seed selector or pickup finger 66 having a passage 67 therethrough communicating with branch 54 and with a right angled seed pickup opening 68 in the leading edge of the finger. Port 57 is open to the cavity formed by rim 33 and side plates 34 and 35. The air from port 56 is exhausted from the interior of rotatable feed wheel 32 through opening 25 around bearing block 22.

Air under pressure in cavities 38 is directed through each supply port 50 into neck portion 52 of the Y-shaped main channel 51, restriction 53 functioning in the manner of a Venturi to expand and accelerate the air stream as it passes through the restriction 53. With channel 59 closed except for the bias orifice 63, low pressure or vacuum is generated on the side of the restriction adjacent channel 59, the effect of which is to pull the air stream toward branch 55 of Y-shaped main channel 51 and eject it at high velocity through port 57.

Passage of the high velocity air jet along the side of restriction 53 adjacent channel 59 through branch 55 and past the entrance to branch 54 generates a vacuum in branch 54 and at seed pickup opening 68 to thus attract seed thereto. A depression 71 in the leading edge of the finger surrounding opening 68 facilitates reception and seating of the seed against the opening.

Control port fitting 61 of each device 46, 47, 48, and 49 is connected to one end of a tube 72, the other end of which is connected to one of four radial openings 73, shown in FIG. 3, formed in the enlarged portion 37 of hub 36 and communicating with an axially directed vent port 74 in the outer face of said portion 37. It will be noted that, through tube 72, radial opening 73 and axially opening port 74, the control port 60 for each device 46, 47, 48, and 49 is thus vented to the space between walls 34 and 35 of the feed wheel. It will also be observed in FIG. 2 that the control port for each of the devices 46, 47, 48, and 49 is circumferentially displaced from the vent port 74 to which it is connected by its tube 72, so that tube 72 from the device 46, for example, is connected to the vent port 74 which is in alignment with the next succeeding control device 47 in the direction of rotation of the feed wheel, as indicated by the arrow in FIG. 2. Similarly, the control ports 60 for devices 47, 48 and 49 are connected, respectively, with the port 74 adjacent the next succeeding control device.

As an alternate means of controlling the air flow control and distributing device pressurized air could be supplied to the fittings 61 and 62 at appropriate times to switch the air flow between the diverging branches 54 and 55.

When pickup finger 66 engages a seed the latter is held there throughout a portion of a revolution of the feed wheel. After a partial revolution is conpleted, as indicated in FIG. 2, the seed is discharged through an outlet 75 formed in closure 26 of the housing 14, to which is connected a delivery tube 76, the lower end of which curves rearwardly of the direction of travel of the planter unit and deposits the seed in the furrow formed by the furrow opening disks 12. The seed is discharged by converting the vacuum at pickup opening 68 to positive air pressure, and this is accomplished by means now to be described.

Reversal of the suction or vacuum at seed pickup opening 68 to discharge the seed through outlet 75 is achieved by the provision of a leaf spring 77, shown in FIGS. 2 and 3. Leaf spring 77 is secured to the inner face of bearing block 22 by one or more screws 78. Spring 77 has a radially extending portion 79 which engages the outer face of enlarged hub portion 37 and closes ports 74 as their corresponding pickup fingers 66 approach outlet 75. Closing the control port 60 causes the stream of air under pressure passing through restrictions 53 to generate a vacuum in channel 58, greater than that in channel 59, this vacuum differential causing the air stream to attach to the channel 58 side of the Y-shaped main channel 51 and to be diverted into branch 54, forcing a jet of high velocity air through pickup finger opening 68 to eject the seed.

In FIG. 2 it will be observed that the pickup finger for control device 49 has ejected its seed, and the vent port 74 connected by its tube 72 to the control port 60 for that device has moved away from the closure portion 79 of spring 77, relieving the vacuum in control channel 58 and returning it to atmospheric pressure, so that bias channel 59 again dominates the air stream causing it to become re-attached to the bias channel side of the main channel 51 and to switch to branch 55 to discharge air from port 57, again generating vacuum in branch 54 and at pickup opening 68 in preparation for again attracting and holding a seed when the finger passes through the seed supply. Thus, the air stream passing radially through each of the control devices 46, 47, 48, and 49 is switched with each revolution of the feed wheel from one side of the Y-shaped main channel to the other and from one branch to the other to alternately generate vacuum in and discharge air from the seed pickup finger. For example, at the same time that pickup finger 66 for control device 46, shown at the bottom of its path of travel in FIG. 2, is in position to pick up a seed, control device 48, shown at the top in FIG. 2, is moving into position for its control port 60 to be closed by engagement of spring 77 with port 74, and to eject its seed into outlet 75.

From the foregoing it should be clear that the same air stream supplied under pressure to the control devices 46, 47, 48 and 49 through the interior 43 of shaft 16 provides both the vacuum for seed pickup and the ejection pressure for discharging the seed.

What is claimed is:

1. Seed metering means for a planter comprising, a housing having a seed supply in its lower portion and a seed discharge outlet, a feed wheel rotatably mounted in said housing, a hub on said wheel having a radial cavity therein, means for directing a constant flow of air under pressure outwardly through said cavity, an air control device on the wheel having a pair of radially opening ports, channel means in said device providing communication between said cavity and said ports, biasing means in said channel means for constraining said air stream to discharge through one of said ports while simultaneously generating vacuum at the other of said ports, and means operable after a predetermined rotation of said wheel for alternately shifting the air stream to said other of said ports.

2. The invention set forth in claim 1, wherein said channel means includes a radially directed main channel having a neck portion communicating with and receiving air under pressure from said cavity, diverging branches terminating in said ports, and a restriction in said channel between said neck and branch portions adapted to accelerate the air stream discharged through said one of said ports.

3. The invention set forth in claim 2, wherein said biasing means is a substantially closed bias channel generally perpendicular to said main channel and communicating therewith at one side of said restriction, vacuum being generated in said side channel by the velocity of the air stream flowing through said restriction to bias the air stream to that side of the main channel and constraining the air to flow through the branch leading to said one of said ports.

4. The invention set forth in claim 3, wherein a pickup finger is mounted on said device and engageable with the seed supply, said finger having an opening therein communicating with the other of said ports and the vacuum therein to attract and hold a seed against said opening during a predetermined rotation of the wheel in said housing between the seed supply and said discharge outlet.

5. The invention set forth in claim 4, wherein said means for alternately shifting the air stream to said other of said ports comprises a control channel in said device connected at one end to said restriction at the other side thereof, said control channel being open at its other end to substantially atmospheric pressure during said predetermined rotation of the wheel, and means in the housing operable after said predetermined rotation of the wheel to close said other end of said control channel and generate a vacuum therein of greater magnitude than that in said bias channel to constrain the air stream to flow through the branch leading to the other of said ports to eject the seed from said finger into said discharge outlet.

6. Seed metering means for a planter comprising, a generally cylindrical housing having a seed supply in its lower portion and a seed discharge outlet circumferentially spaced therefrom, a feed wheel rotatably mounted in said housing, a hub on said wheel having radial cavities therein, means for directing air under pressure to said cavities, an air control device mounted on the wheel having a radially extending branched channel therein comprising a neck portion communicating with and receiving a stream of air under pressure from one of said cavities, a pair of diverging branch portions, and a restriction between said neck and branch portions serving to expand and accelerate the air stream, ports formed at the radially outer ends of said branch portions, and biasing means in said device operatively connected to one side of said restriction for biasing said airstream into one of said branch portions while generating vacuum in the other of said branch portions.

7. The invention set forth in claim 6, wherein a seed pickup finger is affixed to said device adjacent the port formed at the radially outer end of said other of said branch portions, said finger projecting radially from the wheel into engagement with the seed in the housing and having an opening communicating with said one of said branch portions to attract and retain a seed by the vacuum generated in said one of said branch portions.

8. The invention set forth in claim 7, wherein a control channel is formed in said device communicating at one end with the other side of said restriction and vented to atmospheric pressure at its other end during a portion of a revolution of said wheel.

9. The invention set forth in claim 8, wherein closure means is mounted in said housing and is operable, after a predetermined rotation of said wheel, to close said control channel and generate vacuum therein sufficient to overcome the bias in said biasing means and shift the flow of the air stream into said other of said branch portions to eject the seed from said pickup finger.

10. The invention set forth in claim 9, wherein the control channel is under atmospheric pressure during rotation of the pickup finger from the seed supply to said discharge outlet, and said biasing means comprises a substantially closed bias channel in said control device communicating with said restriction and having an orifice therein of such size that the flow of the air Δstream past said bias channel generates low pressure therein sufficient to bias the air stream to that side of the restriction and maintain the vacuum in said seed pickup finger until said discharge outlet is reached, the vacuum generated in said control channel when the latter is closed being sufficient to overcome the low pressure in said bias channel and cause the air stream to attach to the opposite side of said main channel to direct the stream of air under pressure to said finger to discharge the seed from said outlet.

* * * * *